United States Patent [19]
Crabtree

[11] Patent Number: 5,249,388
[45] Date of Patent: Oct. 5, 1993

[54] ONE PIECE FISH SLOT INSERT

[75] Inventor: Cleo G. Crabtree, Lebanon, Mo.

[73] Assignee: Outboard Marine Corporation, Waukegan, Ill.

[21] Appl. No.: 876,036

[22] Filed: Apr. 30, 1992

[51] Int. Cl.⁵ ............................................. A01K 97/04
[52] U.S. Cl. ............................................ 43/55; 43/56
[58] Field of Search ........................... 43/54.1, 55, 56

[56] References Cited

U.S. PATENT DOCUMENTS

| | | | |
|---|---|---|---|
| 321,606 | 7/1885 | Hough | 43/56 |
| 372,233 | 10/1887 | Northrop | 43/56 |
| 504,526 | 9/1893 | Hemp | 43/56 |
| 996,731 | 7/1911 | Searles | 43/56 |
| 1,150,776 | 8/1915 | Lamb . | |
| 1,346,558 | 7/1920 | Rosenwasser | 43/55 |
| 1,476,230 | 12/1923 | Thompson | 43/55 |
| 2,330,870 | 10/1943 | Collier | 43/55 |
| 2,692,007 | 10/1954 | Christian | 43/55 |
| 2,734,305 | 2/1956 | Hannah | 43/56 |
| 3,315,402 | 4/1967 | Scott et al. . | |
| 3,553,880 | 1/1972 | Splickan et al. . | |
| 3,559,329 | 2/1971 | Chiu | 43/55 |
| 4,008,540 | 2/1977 | Brower | 43/55 |
| 4,353,182 | 10/1982 | Junkas | 43/54.1 |
| 4,570,374 | 2/1986 | Baxley | 43/55 |
| 5,038,515 | 8/1991 | Moorhead . | |
| 5,100,198 | 3/1992 | Baltzell | 43/54.1 |

Primary Examiner—Kurt C. Rowan
Attorney, Agent, or Firm—Welsh & Katz, Ltd.

[57] ABSTRACT

A storage container for fish. The container has at least one receiving slot for accepting fish and an insert is provided with a mouth and a flange that corresponds in shape to the slot. The insert includes a rearwardly and downwardly projecting tongue, which projects from the rear side of the flange and into the interior chamber, thereby providing a passageway to the interior chamber for the fish deposited into the slot.

14 Claims, 3 Drawing Sheets

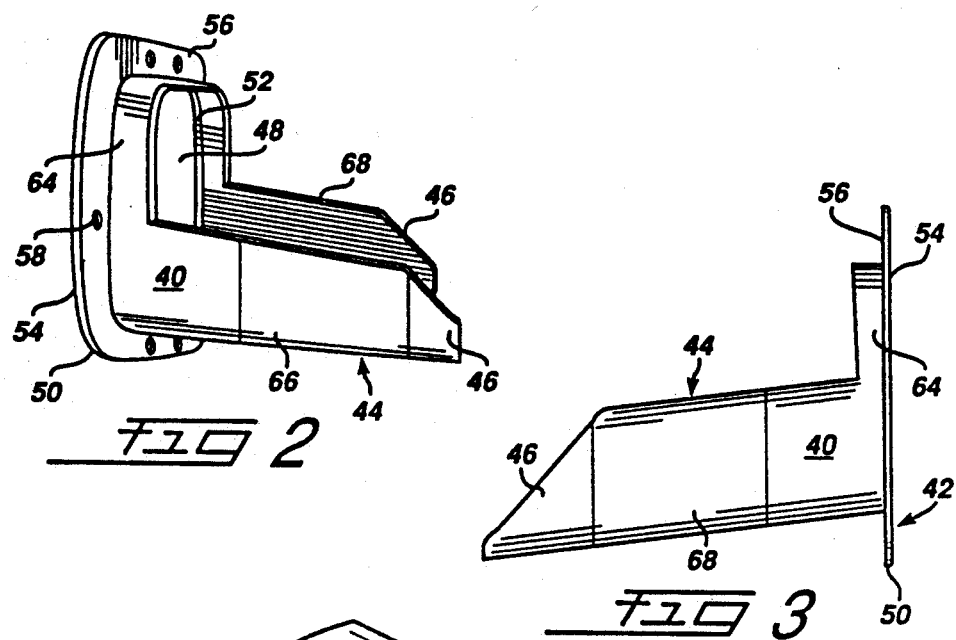
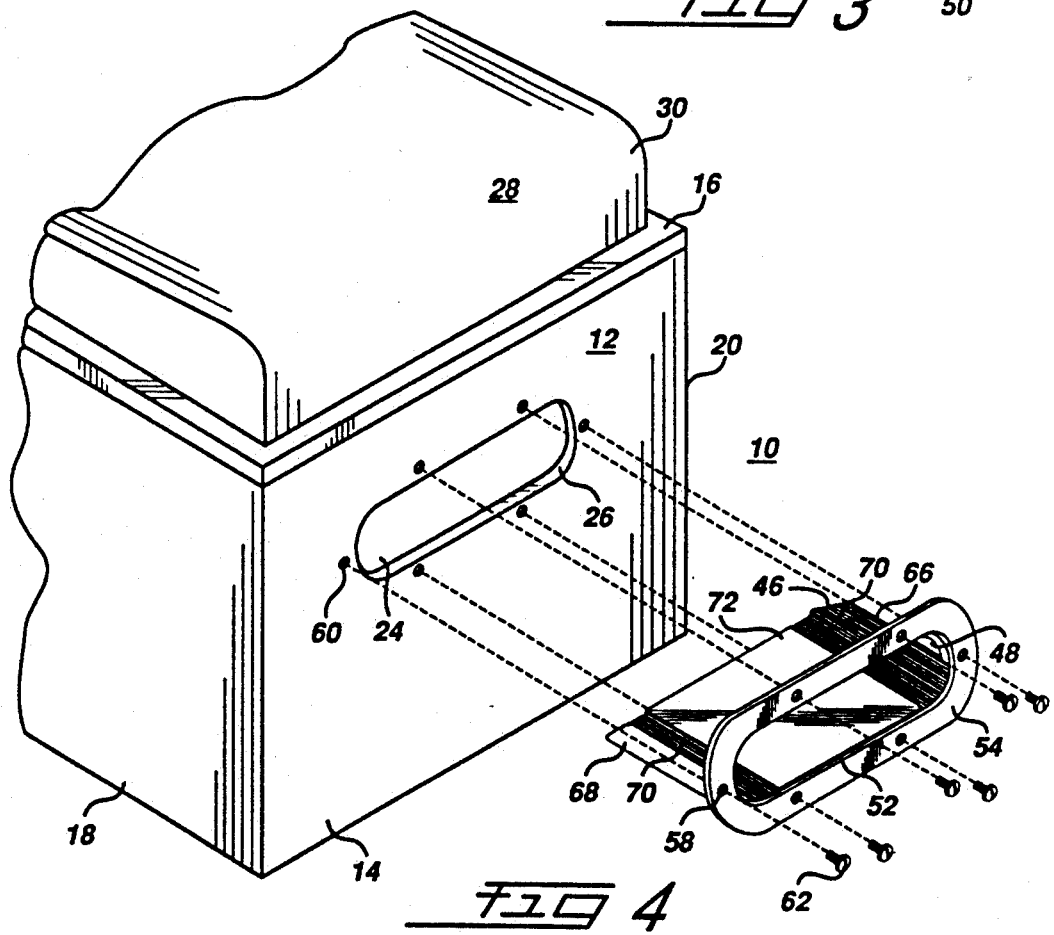

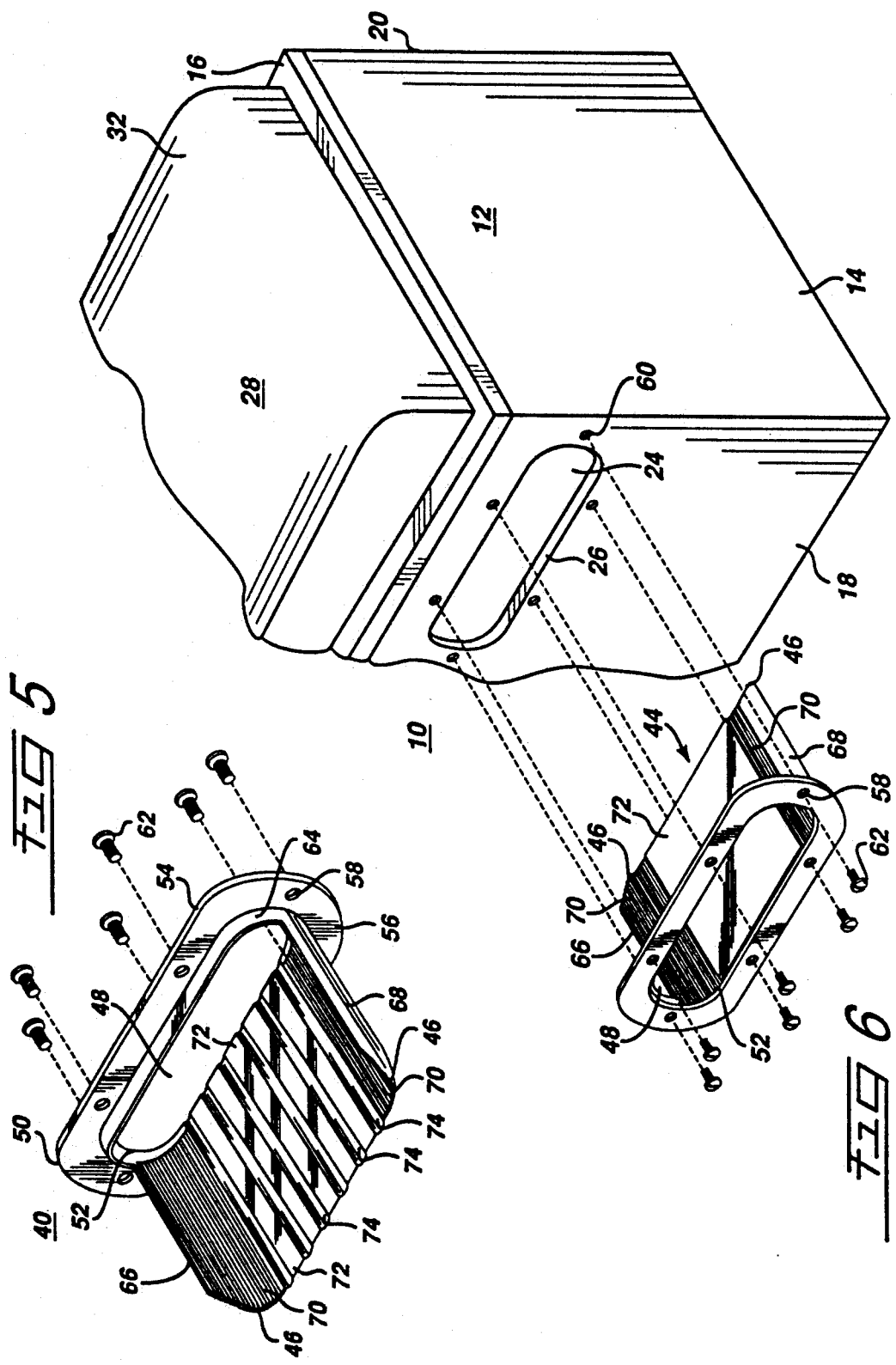

ONE PIECE FISH SLOT INSERT

The present invention relates generally to a one piece fish slot insert for use in connection with a fish storage container which allows an angler to deposit fish into the container as they are caught without having to open the container lid.

BACKGROUND OF THE INVENTION

Over the years, recreational and sport fishing has become increasingly popular in this country. One major contributing factor to the popularity of fishing is that many find it relaxing and a way to escape the ordinary I stresses of everyday life. Accordingly, there are constant improvements and developments relating to fishing gear and equipment that are aimed at increasing the comfort and efficiency of the person fishing. One such item is a box or container for receiving and keeping fish after they are caught. Generally, these containers contain water or ice so that the fish remain fresh until the angler decides to remove and clean them.

It is convenient to retain the fish in such containers without having to clean the fish immediately, especially when the angler is catching many fish in a short period of time or is fishing from a boat. Often, these containers are portable and also serve as a stool or seat for the angler to use while fishing. However, several problems are related to the known currently available methods and apparatus for depositing and retaining the fish within such a container.

First, once the angler catches a fish, the angler must remove the fish from the hook on the fishing rod, open the container and place or drop the fish therein. Accordingly, the angler must normally attempt to juggle or reposition the rod and reel and any other items, such as beverages or food, while removing the fish and opening the container to deposit the fish. On a crowded boat or in a crowded fishing area this can require great acrobatic and balancing skills, especially when the fish is twisting and flinching after being hooked.

Secondly, if the angler is utilizing the container as a seat, the angler will not only have to move the rod and reel or other items around, but will also have to stand up in order to open the container and place the fish in the water or ice. If the angler is having an exceptionally good day and is catching many fish, then the once relaxing fishing activity may begin to resemble an aerobic workout from having to stand and sit each time a fish is caught.

Finally, not only are known, currently available fish containers disruptive and inconvenient to use, but they may also cause the angler to lose fish which were already caught. For instance, because the angler must open the container lid when the angler is placing the most recently caught fish into the container, other previously deposited fish may wiggle or jump out of the container and into the nearby body of water. Such an occurrence could be particularly frustrating when the angler loses a potentially prize winning fish. Relatedly, when the angler places the fish into the container, water may splash or spill out onto the angler, nearby surfaces or onto the floor. The water may have an unpleasant smell and can create a more slippery hazardous surface.

Therefore, there is a need for a container into which live, recently caught fish can be deposited and retained quickly, effectively, and without disruption to the angler's comfort or the fishing activity of other nearby anglers. There is also a need for a container which minimizes fish and water loss when fish are placed into the container.

SUMMARY OF THE INVENTION

Accordingly, it is an object of the present invention to provide a fish container for retaining and preserving fish after being caught, which includes a slot located along at least one side of the container for receiving the fish and which includes a one piece fish slot insert which is adapted for insertion into the slot to allow an angler to quickly and efficiently deposit fish into the container without having to open the container.

It is a further object of the present invention to provide a fish container for retaining and preserving recently caught fish which includes a seating structure for the angler and which includes a slot and a ramp-like slot insert which allows an angler to quickly and efficiently deposit fish into the container without having to stand up and without losing water or previously caught fish while opening the container to deposit the fish.

In accordance with the present invention, all of these objects, as well as others not herein specifically identified, are achieved generally by the present fish storage container and one piece fish slot insert.

Broadly stated, the present invention includes a fish storage container or receptacle having at least one slot which provides an entryway to an interior chamber of the container. The interior chamber is configured to retain a sufficient amount of water or ice to maintain the freshness of the fish and may be insulated to better preserve the fish once deposited within the container. The slot itself may be round or ovally shaped and is typically formed to be installed through a side of the container. The storage container may also include an optional seat formation integral with or removably secured to the upper surface of the container lid or top.

Further, a one piece fish slot insert is configured for insertion into the slot of the container. The slot insert includes a mouth portion with an integral flange. The innermost edge of the flange defines an aperture or opening which generally conforms to the shape of the slot. The flange includes through bores which align with bores formed around the periphery of the slot on the container for removably securing the insert to the container. The insert may also include an optional rearwardly projecting lip formation which provides rigidity and support to the insert once secured to the container. The lip is integrally formed on the rear side of the flange, extends substantially around the perimeter of the aperture and is thick enough to provide support to the insert Without obstructing the bores.

The insert further includes an integral tongue formation which projects from the rear side of the flange or the optional lip formation. The tongue is generally formed with a downwardly inclined slope, and is of sufficient length to provide unobstructed ingress to the interior chamber of the container. The tongue forms a chute, having a raised central platform that allows the fish to easily slide down the tongue and into the interior chamber. The aperture and the tongue are configured and arranged so as to provide sufficient clearance for the particular type of fish intended to be caught and deposited into the container. The tongue is configured to also act as a guard for preventing the escape of previously stored fish and also to minimize spillage of water caused when depositing the fish or when water is being splashed by the fish held in the container.

BRIEF DESCRIPTION OF THE DRAWINGS

Other features and advantages of the present fish container and one piece fish slot insert will become apparent to those skilled in the art upon review of the following detailed description, claims and drawings, in which:

FIG. 2 depicts a side perspective view of the insert;

FIG. 3 depicts a side view of the insert;

FIG. 4 depicts a front perspective view of the container with the insert removed therefrom;

FIG. 5 depicts a front perspective view of the insert; and

FIG. 6 depicts a side perspective view of an alternative embodiment of the present container and insert.

DETAILED DESCRIPTION OF THE PREFERRED EMBODIMENT

Figure 1:
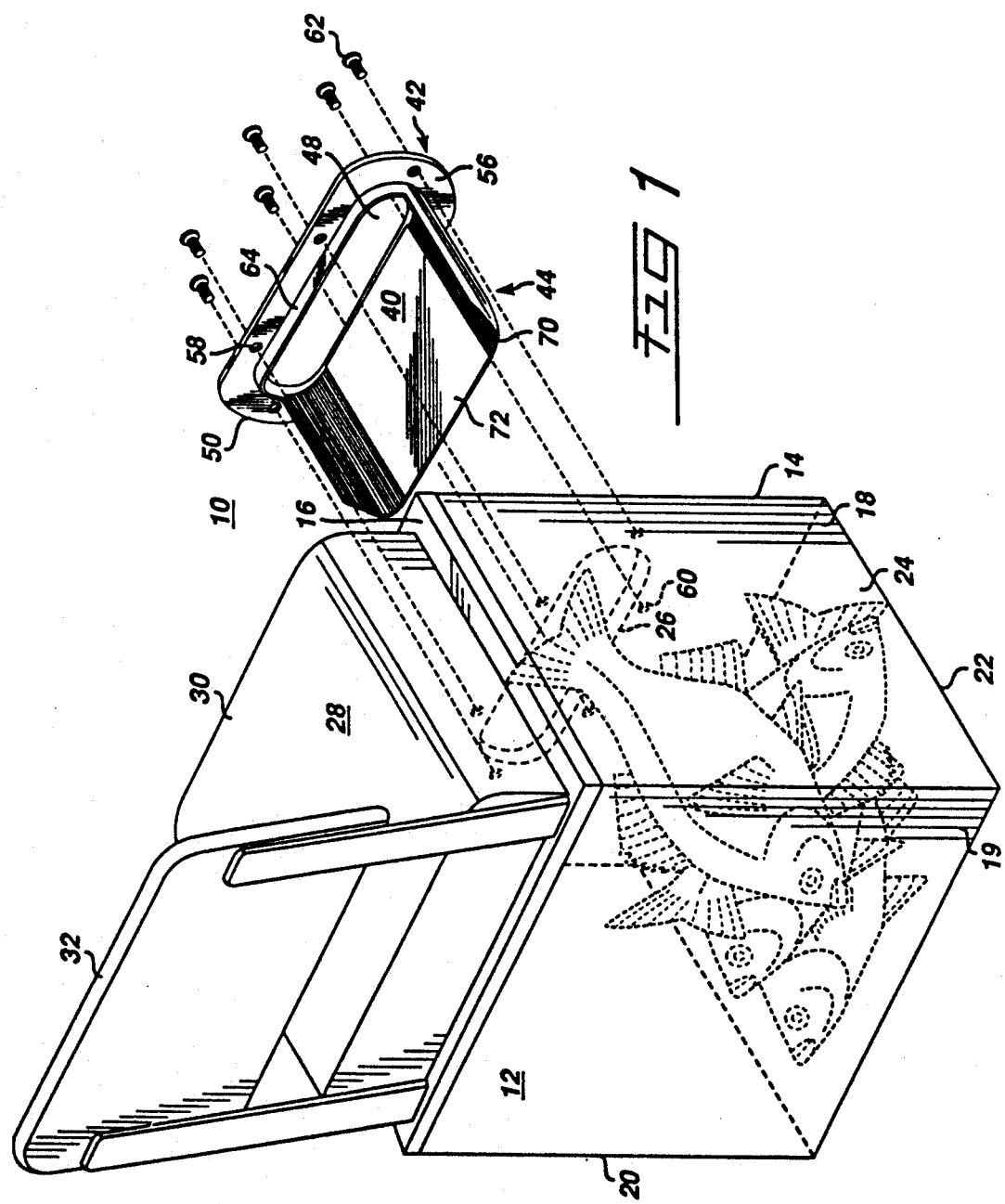
FIG. 1 depicts a side perspective view of the container with the insert removed therefrom.

Referring more particularly to FIG. 1, the present combination fish storage container with a one piece fish slot insert is generally designated as 10. The fish storage receptacle or container, indicated generally at 12, is depicted as having a generally square configuration with at least a front side 14 and an upper surface 16. The upper surface 16 may be configured as a lid which opens and provides access to the contents of the container 12. Typical containers will also have sides 18, 19, and 20 and a bottom surface 22. The storage container 12 should be shaped and large enough to accommodate a sufficient quantity of the type of fish intended to be caught and placed into the container 12. Accordingly, it is contemplated that the container 12 may be configured in numerous proportions other than that shown. It should also be understood that the container 12 can be fully portable and transportable, or can be secured to or integral with the deck of a boat. The container 12 can be made from any rigid and sufficiently durable material which can retain and insulate the water or ice used to preserve the freshness of the fish.

To this end, the storage container 12 also has an interior chamber 24 which is configured to retain a predetermined amount of water or ice or combination thereof to preserve the freshness of the fish until the angler can clean them. As shown in FIG. 4, the interior chamber 24 comprises the inside of the container 12. Typically, full, unrestricted access to the interior chamber 24 is through the upper surface 16. Additionally, it may be desirable to insulate the interior chamber 24 to maintain a sufficiently cold interior temperature to further increase the ability of the container 12 to preserve the freshness of the fish until they can be cleaned.

As shown in FIGS. 1 and 4, the container 12 includes at least one ingress passage or receiving slot 26 that is formed through the front side 14 and is in fluid connection with the interior chamber 24. It is preferred that the slot 26 be formed through the front side 14 to facilitate the depositing or placement of the fish by the angler into the container 12, especially if an optional seating assembly 28 is utilized. It should be understood that the slot 26 can also be formed on any of the other sides 18, 19 or 20 of the container 12 (as shown in FIG. 6) without departing from the objects of the present invention. Additionally, the slot 26 may be formed on more than one side of the container 12.

If the optional seating assembly 28 is included with the container 12, it will typically be integral with or removably secured to the upper surface 16. As shown, the seating assembly 28 includes a seat portion 30 and a back portion 32. It is contemplated that the back portion 32 can be designed to fold down onto the seat portion 30 to maintain the portability of the container 12.

Referring now to FIGS. 2 through 4, the fish slot insert is indicated as 40. Preferably, the insert 40 will be a one piece assembly, but a multipiece construction may be substituted and will function equally as well. Additionally, it is contemplated that the insert 40 will be made of a sufficiently rigid plastic material that is inexpensive and lightweight. The insert 40 is configured to be mounted into the slot 26 of the container 12 and provides a passageway for the deposited fish into the interior chamber 24. The configuration of the insert 40 will depend on the particular configuration and arrangement of the slot 26.

As best seen in FIGS. 2 through 5, the insert 40 includes two main portions, a mouth portion 42 and a tongue portion 44. The mouth portion 42 is formed to include an aperture 48. The aperture 48 will typically be dimensioned to match the configuration and dimensions of the slot 26. As shown, the aperture 48 is oval to match the oval shape of slot 26, but other configurations will work equally as well without departing from the nature of the present invention. The mouth portion 42 includes an integral flange 50 formed along the outermost perimeter 52 of the aperture 48 and includes a front side 54 and a rear side 56.

As best shown in FIGS. 1 and 5, the flange 50 includes a plurality of throughbores 58 which correspond to bores 60 formed around the periphery of slot 26 on the container 12. A plurality of fasteners 62, which are inserted through the throughbores 58 and the bores 60, removably and securely fasten the insert 40 onto the container 12 and into the slot 26. It is contemplated that other methods of fastening the insert 40 to the container 12, such as providing a frictional fit between the insert 40 and the slot 26 or the use of adhesives, can be utilized without departing from the principle of the invention as disclosed herein. The flange 50 not only provides a mounting surface between the insert 40 and the container 12, but also provides the insert with increased rigidity and support which helps prevent the insert 40 from experiencing possible deformation.

An optional lip 64 is integrally formed on the rear side 56 of the flange 50 and extends rearwardly away from the flange 50. As best shown in FIGS. 2 and 5, the lip 64 extends fully around the rear side 56 of the flange 50 and is generally flush with the outermost periphery 52 of the aperture 48. It is contemplated the lip 64 may extend only partially around the rear side 56 of the flange 50 or be formed away from the periphery 52 of the aperture 48. However, it is preferred that the lip 64 be flush with the outermost periphery 52 so as to provide a smoother entryway for the fish being deposited in the container 12. If the lip 64 is not flush with the outermost periphery 52, the fish may become lodged or caught within the insert 40, and if not pushed into the container 12 by the angler, may fall or wiggle out of the insert 40 and onto the ground or into the body of water. Further, it is preferred that the lip 64 extend fully around the rear side 56 of the flange 50 to provide the insert 40 with added strength and support when mounted into the slot 26. The lip 64 will increase the stability of the insert 40 within the slot 26 and help prevent the insert 40 from falling out, loosening or becoming misaligned during use over time.

Extending from the lip 64 is the second portion of the mouth 42, or tongue 44. Referring specifically to FIGS. 2 and 3, the tongue 44 is downwardly inclined or sloped and projects outwardly from the lip 64. Although not necessary, it is preferred that the tongue 44 be integrally formed at the lip 64 to retain the one piece construction of the insert 40. The tongue 44 is sufficiently long to extend into the interior chamber 24 of the container 12, and provides a passageway or chute for the fish to slide down into the interior chamber 24. Also, the tongue 44 should have a width no wider than the slot 26 to insure that the insert 40 will fit properly through the slot 26 during attachment to the container 12.

As best shown in FIGS. 5 and 6, the tongue 44 has an end 46 which can be tapered inwardly to eliminate an otherwise sharp edge that an angler could strike and to facilitate easy insertion into the slot 26 during installation. The tongue 44 also includes upwardly curved sides 66 and 68 that form gutters 70 and function to provide structural rigidity for the tongue 44. The curved sides 66 and 68 generally follow the curvature of the lip 64, since the tongue 44 projects from the lip 64. The curved sides 66 and 68 terminate at the end 46 of the tongue 44 and are dimensioned to compliment the inwardly tapered configuration of the end 46. It is preferred that the connection point between the tongue 44 and the lip 64 be smooth so that the fish do not become lodged within the insert 40.

The tongue 44 also includes a raised platform 72 centrally located between the sides 66 and 68. Although optional, it is preferred that the platform 72 be included to act as a sliding surface that will increase the ease of entry and provide increased structural strength for the tongue. In the preferred embodiment, the platform 72 will typically be integral with the tongue 44 and follow the gradient of the downward slope of the tongue 44. Alternatively, as shown in FIG. 5, the platform 72 may be configured with ridges or grooves 74.

The present invention is also concerned with decreasing the mess associated with containing fish within the container 12 and with protecting the contents of the interior chamber 24. Accordingly, because the tongue 44 is inclined downwards, and extends into the interior chamber 24, it functions to drain fluids, into the chamber 24, instead of dripping onto the floor or on the outside of the container 12. Furthermore, the tongue 44 acts as a flap that substantially blocks fluids and fish contained in the interior chamber 24 from escaping or splashing water out of the aperture 48. Finally, the tongue 44 protects the contents held within the interior chamber 24 from exposure to direct sunlight by substantially shading or blocking the sunlight from entering into the container 12 through aperture 48.

In the practice of the invention, once the insert 40 has been secured to the container 12, and more particularly into the slot 26, the angler can quickly and efficiently deposit fish into the container 12 without having to open the lid or upper surface 16. Essentially, the angler can remain seated, as on seating assembly 28, on the upper surface 16 of the container 12 while fishing, and as fish are caught, deposit them directly into the container 12 to preserve their freshness until they can be cleaned. Because the insert 40 includes a downwardly inclined tongue 44, the angler can easily deposit the fish into the container 12 by merely placing a portion of the fish into the aperture 48 and allowing gravity to pull or slidably direct the fish down into the interior chamber 24.

As a consequence, the angler can catch fish, unhook them and quickly send them down into the interior chamber 24 without disturbing other nearby anglers and without disrupting the fishing area. If the angler is fishing from a boat, the present container 12 and insert 40 may prevent the angler from taking an unexpected fall into the water or even flipping the boat, since the angler does not have to stand or reposition items to deposit the fish in the container 12.

Additionally, in accordance with the discussion above, the tongue 44 will help to minimize the loss of fluid or fish from the container 12, since it effectively blocks the egress passageway out of aperture 48 from within the interior chamber 24. Moreover, if the present invention 10 is utilized with the seat assembly 28, the angler need only unhook the caught fish, and in one motion deposit the fish into the aperture 48, which would typically be between the angler's legs (or alternatively along one side). The risk of dropping or losing the fish is greatly reduced because the angler will not have to stand up or move around the fishing area to open the container 12. Also, because the angler does not have to open the container 12, the risk of fish jumping out of the container 12 is significantly reduced. Overall, the insert 40 is relatively simple and inexpensive to manufacture, but provides an angler with an efficient and easy to use apparatus for storing and preserving fish as they are caught without disturbing the angler's comfort. Further, because the preferred embodiment contemplates a one piece construction for the insert 40, it is much easier to install and replace than an insert utilizing a multipiece assembly.

While a preferred embodiment and various alternative features of the present invention have been shown and described, it should be understood that various other alternatives, substitutions and equivalents can be used, and that the present invention should only be limited by the claims and equivalents thereof.

Various features of the present invention are set forth in the following claims.

What is claimed is:

1. A combination fish receiving and storing assembly, the combination comprising;

a storage container having an interior chamber configured to retain a sufficient amount of fluid for preserving fish and an upper surface configured as a lid, said lid providing access to said interior chamber;

said storage container having at least one receiving slot for accepting the fish, said slot being in fluid communication with said interior chamber of said container;

an insert having a mouth portion with a flange, said flange having a front side and a rear side, said flange defining an aperture of said mouth portion;

a tongue projecting from said rear side of said flange and into said storage container, said tongue having a raised central platform; and means for securing said insert onto said container and into said at least one slot.

2. The combination as defined in claim 1 wherein said tongue projects from said rear side of said flange at a downward slope.

3. The combination as defined in claim 1 wherein said raised central platform includes a plurality of parallel grooves that facilitate the drainage of fluids into said interior chamber.

4. The combination as defined in claim 1 wherein said rear side of said flange includes a rearwardly projecting and integral lip, said lip providing added support to said mouth portion when inserted into said slot.

5. The combination as defined in claim 1 wherein said upper surface of said container has a seat formation secured thereto.

6. The combination as defined in claim 1 wherein said tongue includes a first channel and a second channel formed alongside said raised central platform.

7. A combination fish receiving and storing assembly, the combination comprising a storage container having an interior chamber configured to retain a sufficient amount of fluid for preserving fish and an upper surface configured as a lid, said lid providing access to said interior chamber;

said storage container having at least one receiving slot for accepting the fish, said slot providing restricted access to said interior chamber of said container;

an insert formed form a rigid material, said insert having a mouth portion with a flange, said flange having a front side and a rear side, said flange defining an aperture of said mouth portion;

a tongue projecting integrally from said rear side of said flange at a downward slope, said downward slope, said downward slope being of a sufficient gradient to cause the fish to slide down said tongue and into said interior chamber of said container, said tongue also includes a central sliding surface and a first gutter and a second gutter formed alongside said surface; and means for securing said insert onto said container and into said at least one slot.

8. The combination as defined in claim 7 wherein said central sliding surface includes a plurality of parallel grooves to facilitate the drainage of fluids into said interior chamber.

9. The combination as defined in claim 7 wherein said rear side of said flange further includes a rearwardly projecting and integral lip, said lip providing added support to said mouth portion when secured to said container.

10. The combination as defined in claim 7, wherein said upper surface of said container has a seat formation secured thereto.

11. A one piece fish receiving insert for a fish storage container, the storage container being configured for retaining and preserving fish and having at least one slot for receiving fish and for providing restricted access to the interior of the container, the insert comprising:

a mouth portion with a flange, said flange having a front side and a rear side, said flange defining an aperture of said mouth portion;

said rear side of said flange having a rearwardly projecting and integral lip, said lip providing added support to said mouth portion when inserted into said slot;

a tongue projecting away from said lip, said tongue having a downward slope with a gradient sufficient to cause the fish to be slidably directed into the interior of the container;

a raised central sliding surface formed on said tongue, said sliding surface includes a plurality of parallel grooves to facilitate the drainage of fluids into said interior chamber; and means for securing the insert onto said container and into said at least one slot.

12. The insert as defined in claim 11 wherein said tongue further includes upwardly curved first and second sides and an inwardly tapered end portion.

13. The insert as defined in claim 11 wherein said tongue is configured and arranged to act as a splash guard which blocks the contents retained in the interior of the container from escaping through the slot.

14. The insert as defined in claim 11 wherein said aperture of said mouth portion is dimensioned to correspond to the particular configuration of the slot.

* * * * *